US009893396B2

(12) United States Patent
Trimble et al.

(10) Patent No.: US 9,893,396 B2
(45) Date of Patent: Feb. 13, 2018

(54) METHOD OF OPERATING AND CONDITIONING ELECTROCHEMICAL CELLS COMPRISING ELECTRODEPOSITED FUEL

(71) Applicant: FLUIDIC, INC., Scottsdale, AZ (US)

(72) Inventors: Todd Trimble, Phoenix, AZ (US); Sergey Puzhaev, Scottsdale, AZ (US); Joel Hayes, Chandler, AZ (US); Ramkumar Krishnan, Scottsdale, AZ (US); Cody A. Friesen, Fort McDowell, AZ (US)

(73) Assignee: FLUIDIC INC., Scottsdale, AZ (US)

( * ) Notice: Subject to any disclaimer, the term of this patent is extended or adjusted under 35 U.S.C. 154(b) by 421 days.

(21) Appl. No.: 14/512,933

(22) Filed: Oct. 13, 2014

(65) Prior Publication Data
US 2015/0104679 A1  Apr. 16, 2015

Related U.S. Application Data

(60) Provisional application No. 61/890,728, filed on Oct. 14, 2013.

(51) Int. Cl.
*H01M 10/42* (2006.01)
*H01M 10/44* (2006.01)
(Continued)

(52) U.S. Cl.
CPC ........... *H01M 12/02* (2013.01); *H01M 10/42* (2013.01); *H01M 10/44* (2013.01); *H01M 12/08* (2013.01); *Y02E 60/128* (2013.01)

(58) Field of Classification Search
CPC ...... H01M 10/42; H01M 10/44; H01M 12/02; H01M 12/08
(Continued)

(56) References Cited

U.S. PATENT DOCUMENTS 3,556,849 A   1/1971   Oswin et al.
4,616,170 A   10/1986  Urstoger
(Continued)

FOREIGN PATENT DOCUMENTS

EP       1 544 937        6/2005
WO    WO 2013/066829     5/2013

OTHER PUBLICATIONS

International Preliminary Report on Patentability dated Jan. 8, 2016 for PCT/US2014/060294.
(Continued)

*Primary Examiner* — Sean P Cullen
(74) *Attorney, Agent, or Firm* — Pillsbury Winthrop Shaw Pittman LLP (57) ABSTRACT

A process for conditioning an electrochemical cell system comprising at least two electrochemical cells comprises selecting from the fuel electrodes of the electrochemical cells groups comprising: a charged group and a reset group. The process also comprises holding the fuel electrodes within the charged group at a predetermined state of charge associated with a set concentration of metal fuel ions in solution in the ionically conductive medium. The process further comprises resetting the fuel electrodes within the reset group. An electrochemical cell system includes a plurality of fuel electrodes and one or more controllers configured to regulate the concentration of reducible metal fuel ions in solution with an ionically conductive medium by maintaining a predetermined state of charge of at least one of the fuel electrodes, and initiate a charging, discharging, or resetting process on at least one other fuel electrode. Other features and embodiments are also disclosed.

25 Claims, 2 Drawing Sheets

(51) Int. Cl.
*H01M 12/02* (2006.01)
*H01M 12/08* (2006.01)

(58) Field of Classification Search
USPC .......... 429/49, 402, 403, 404, 406; 320/132
See application file for complete search history.

(56) References Cited

U.S. PATENT DOCUMENTS

| | | | |
|---|---|---|---|
| 4,691,158 | A | 9/1987 | Hashimoto et al. |
| 4,730,153 | A | 3/1988 | Breting et al. |
| 4,857,419 | A | 8/1989 | Jinnai et al. |
| 5,302,472 | A | 4/1994 | Ando et al. |
| 5,998,968 | A | 12/1999 | Pittman et al. |
| 7,642,749 | B2 | 1/2010 | Nishida |
| 7,939,190 | B2 | 5/2011 | Colello et al. |
| 8,168,337 | B2 | 5/2012 | Friesen et al. |
| 8,309,259 | B2 | 11/2012 | Friesen et al. |
| 8,491,763 | B2 | 7/2013 | Friesen et al. |
| 8,492,052 | B2 | 7/2013 | Friesen et al. |
| 8,659,268 | B2 | 2/2014 | Krishnan et al. |
| 2010/0119895 | A1 | 5/2010 | Friesen |
| 2010/0285375 | A1 | 11/2010 | Friesen et al. |
| 2010/0316935 | A1 | 12/2010 | Friesen et al. |
| 2011/0070506 | A1 | 3/2011 | Friesen et al. |
| 2011/0086278 | A1 | 4/2011 | Friesen et al. |
| 2011/0189551 | A1 | 8/2011 | Friesen et al. |
| 2011/0199055 | A1* | 8/2011 | Burchardt ............ H01M 10/44 320/148 |
| 2011/0200893 | A1 | 8/2011 | Friesen et al. |
| 2011/0250512 | A1 | 10/2011 | Friesen et al. |
| 2011/0281184 | A1 | 11/2011 | Friesen et al. |
| 2011/0316485 | A1 | 12/2011 | Krishnan et al. |
| 2012/0009491 | A1 | 1/2012 | Friesen et al. |
| 2012/0015264 | A1 | 1/2012 | Friesen et al. |
| 2012/0068667 | A1 | 3/2012 | Friesen et al. |
| 2012/0098499 | A1 | 4/2012 | Friesen et al. |
| 2012/0139496 | A1 | 6/2012 | Krishnan et al. |
| 2012/0202127 | A1 | 8/2012 | Friesen et al. |
| 2012/0321969 | A1 | 12/2012 | Friesen et al. |
| 2013/0022881 | A1 | 1/2013 | Friesen et al. |
| 2013/0115523 | A1 | 5/2013 | Friesen et al. |
| 2013/0115525 | A1 | 5/2013 | Friesen et al. |
| 2013/0115526 | A1 | 5/2013 | Friesen et al. |
| 2013/0115532 | A1 | 5/2013 | Friesen et al. |
| 2013/0115533 | A1 | 5/2013 | Friesen et al. |

OTHER PUBLICATIONS

International Search Report and Written Opinion dated Jan. 19, 2015 for PCT/US2014/060294.

* cited by examiner

METHOD OF OPERATING AND CONDITIONING ELECTROCHEMICAL CELLS COMPRISING ELECTRODEPOSITED FUEL

CROSS-REFERENCE TO PRIOR APPLICATION

This application claims benefit to U.S. Provisional Application Ser. No. 61/890,728 filed Oct. 14, 2013, the entire contents of which is incorporated herein.

FIELD

The invention relates to electrochemical cells comprising electrodeposited metal fuel, and more particularly to a method of operating and conditioning electrochemical cell systems comprising electrodeposited metal fuel.

BACKGROUND

Various types of electrochemical cells using metal as the fuel are known such as metal-air, Pb-acid, and Ni—Zn batteries. For example, a metal-air cell typically comprises a fuel electrode at which metal fuel is oxidized and an air breathing cathode at which oxygen from ambient air is reduced during a discharge mode. During a charge mode, the metal fuel is reduced and electrodeposited at the fuel electrode, thereby storing the metal fuel for a future discharge process. The electrochemical cell comprises an electrolyte for supporting reactions of the oxidized/reduced ions. During discharge, the concentration of the reducible metal species in the electrolyte increases towards a saturation point. A significant challenge with these types of cells is non-uniformity of charge/discharge and electrode passivation due to high concentrations of metal fuel ions in the electrolyte, resulting in poor cycling behavior. On cycling, build-up of metal fuel (e.g. formation of dendrites) causes problems including premature formation of electrical connections between electrodes, reduced charge capacity and lower overall cell efficiency in the battery.

Among other things, the present application endeavors to provide an effective and improved way of operating electrochemical cells comprising electrodeposited metal fuel, minimizing passivation of the metal fuel on cycling, eliminating the areas of metal fuel buildup at the fuel electrode, and effectively conditioning the fuel electrode to a fresh chargeable condition.

SUMMARY

According to an embodiment, a process is provided for conditioning an electrochemical cell system comprising at least two electrochemical cells. Each cell comprises a fuel electrode for receiving electrodeposited metal fuel, an oxidant electrode spaced apart from the fuel electrode, a charging electrode spaced apart from the fuel electrode, and an ionically conductive medium communicating the cells of the electrochemical cell system for conducting ions to support electrochemical reactions at the fuel, oxidant, and charging electrodes, the ionically conductive medium comprising reducible metal fuel ions. The fuel electrode and the oxidant electrode are configured to, during a discharge mode, oxidize the metal fuel at the fuel electrode and reduce an oxidant at the oxidant electrode to generate an electrical discharge current therebetween for application to a load. The fuel electrode and the charging electrode are configured to, during a charge mode, reduce a reducible species of the fuel to electrodeposit the fuel on the fuel electrode and oxidize an oxidizable species of the oxidant by application of an electrical charge current therebetween from a power source. The conditioning process comprises selecting from the fuel electrodes of the at least two electrochemical cells groups comprising: a charged group and a reset group. The process also comprises holding the fuel electrodes within the charged group at a predetermined state of charge associated with a set concentration of metal fuel ions in solution in the ionically conductive medium. The process further comprises resetting the fuel electrodes within the reset group.

According to another embodiment, an electrochemical cell system comprises at least a first electrochemical cell and a second electrochemical cell within a common ionically conductive medium. Each of the first and second electrochemical cells comprises a fuel electrode for receiving electrodeposited metal fuel, an oxidant electrode spaced apart from the fuel electrode, and a charging electrode spaced apart from the fuel electrode. The ionically conductive medium communicates the electrodes for conducting ions to support electrochemical reactions at the electrodes, and comprising reducible fuel ions. The fuel electrode and the oxidant electrode being configured to, during a discharge mode, oxidize the metal fuel at the fuel electrode and reduce an oxidant at the oxidant electrode to generate an electrical discharge current therebetween for application to a load. The fuel electrode and the charging electrode being configured to, during a charge mode, reduce a reducible species of the fuel to electrodeposit the fuel on the fuel electrode and oxidize an oxidizable species of the oxidant by application of an electrical charge current therebetween from a power source. The system also includes one or more controllers configured to regulate the concentration of reducible metal fuel ions in solution with the ionically conductive medium by maintaining a predetermined state of charge of at least one of the fuel electrodes. The one or more controllers are also configured to initiate a charging, discharging, or resetting process on at least one other fuel electrode.

According to another embodiment, a process is provided to remove dendritic formations in an electrochemical cell system comprising a plurality of cells. Each cell comprises a fuel electrode configured to receive electrodeposited metal fuel thereon, an oxidant electrode spaced apart from the fuel electrode, and a charging electrode spaced apart from the fuel electrode. An ionically conductive medium is common to the plurality of cells, the ionically conductive medium comprising reducible metal fuel ions therein, and communicating the electrodes to support electrochemical reactions at the electrodes. The fuel electrode and the oxidant electrode are configured to, during a discharge mode, oxidize the metal fuel at the fuel electrode and reduce an oxidant at the oxidant electrode to generate an electrical discharge current therebetween for application to a load. The fuel electrode and the charging electrode are configured to, during a charge mode, reduce the reducible metal fuel ions as electrodeposited metal fuel on the fuel electrode and oxidize an oxidizable species of the oxidant by application of an electrical charge current therebetween from a power source. The process includes charging at least one of the plurality of cells to reduce a concentration of reducible metal fuel ions in the ionically conductive medium. The process also includes, when the concentration of reducible metal fuel ions is below a threshold amount, discharging or resetting at least one other cell of the plurality of cells.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
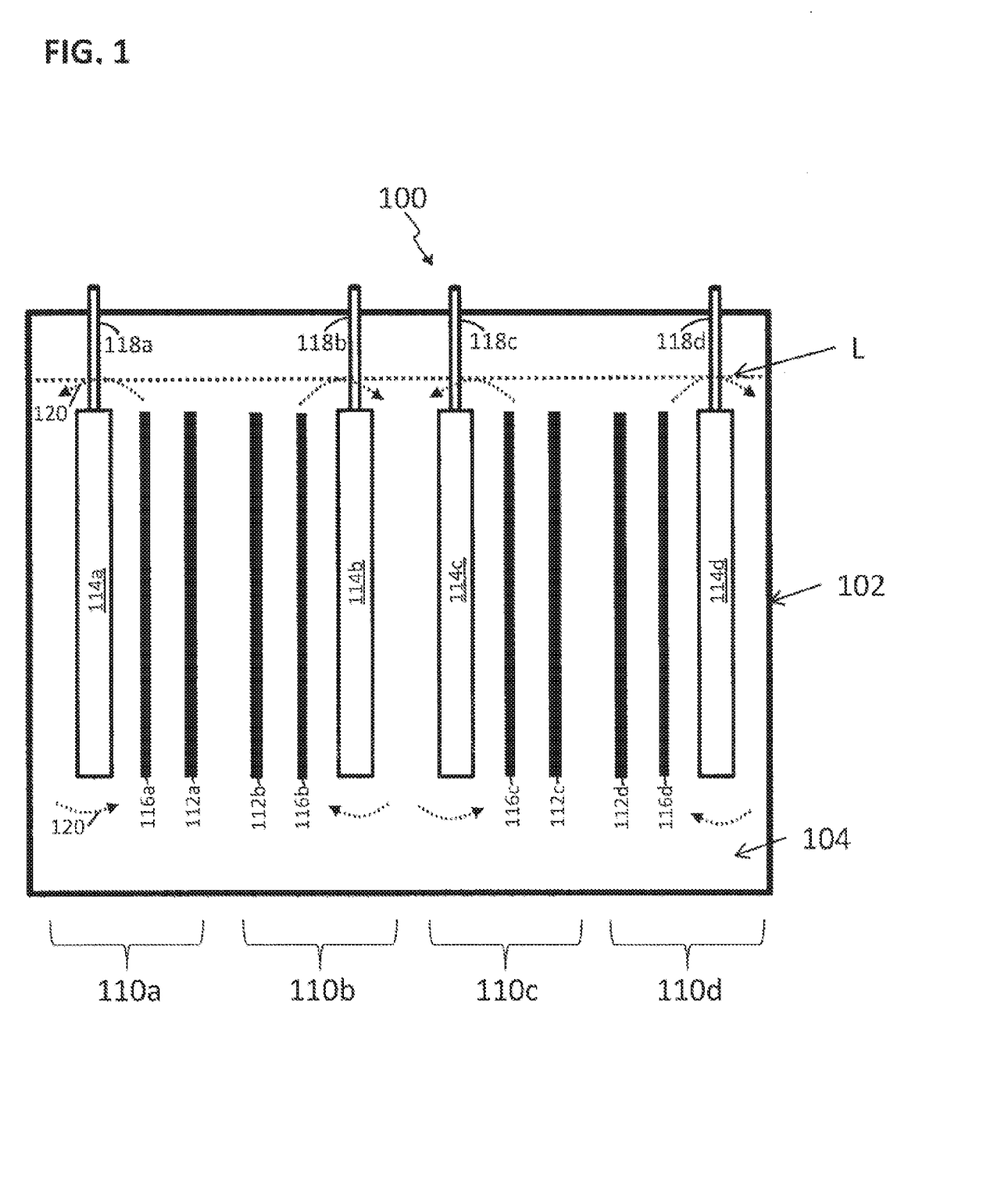
FIG. 1 depicts a cross-sectional view of an electrochemical cell system that comprises four electrochemical cells.

As a non-limiting exemplary embodiment of the invention, FIG. 1 illustrates a schematic cross sectional view of electrochemical cell system 100. As shown, the components of electrochemical cell system 100 may be contained at least partially in an associated housing 102 defining an interior cell chamber, generally depicted at 104, configured to contain a volume of ionically conductive liquid therein. In an embodiment, discrete housings 102 may be linked to share the volume of ionically conductive liquid distributed across the housings 102, and may circulate between the housings 102 (e.g., driven by a fluid pump). In an embodiment, the system 100 utilizes a liquid ionically conductive medium that is contained within a common housing 102, and is configured to circulate therein to conduct ions within the cell system 100. In an embodiment, the amount of liquid ionically conductive medium within the housing 102 may reach a level L. While at times the ionically conductive medium may be generally stationary within the housing 102, such as in a stagnant zone, it may be appreciated that the cell system 100 may be configured to create a convective flow of the ionically conductive medium. In some embodiments, the flow of the ionically conductive medium may be a convective flow generated by bubbles of evolved gas in the cell system 100, such as is described in the U.S. patent application Ser. Nos. 13/531,962; 13/532,374 and 13/666,864 incorporated herein in their entirety. Various portions of the electrochemical cell system 100 may be of any suitable structure or composition, including but not limited to being formed from plastic, metal, resin, or combinations thereof. Accordingly the cell system 100 may be assembled in any manner, including being formed from a plurality of elements, being integrally molded, or so on. In various embodiments the electrochemical cell system 100 may include elements or arrangements from one or more of U.S. Pat. Nos. 8,168,337; 8,309,259; 8,491,763; 8,492,052; 8,659,268 and U.S. patent application Ser. Nos. 12/631,484; 12/776,962; 12/885,268; 13/028,496; 13/083,929; 13/185,658; 13/230,549; 13/277,031; 13/299,167; 13/362,775; 13/526,432; 13/531,962; 13/532,374; 13/666,864; 13/668,185; 61/707,478; and 61/763,428; each of which are incorporated herein in their entireties by reference.

In an embodiment of the cell system 100, such as that illustrated in FIG. 1, multiple cells 110a, 110b, 110c, and/or 110d may be installed together in a common housing 102. Such an assembly may increase energy and/or power density, may facilitate desired flow directions based on the interaction of bubbles generated from each cell, may reduce production costs by reducing the number of discrete parts therein or otherwise. The assembly of FIG. 1 contains four cells 110a, 110b, 110c, and 110d therein, and thus may be referred to as quad-cell system 100. It may be appreciated that the four cells (individually cell 110a, 110b, 110c and 110d) define quad-cell system 100, although fewer or additional cells may also be included in other embodiments (i.e. forming a bi-cell, tri-cell, a penta-cell, or so on). Although in some embodiments cells 110a, 110b, 110c, and/or 110d may share common electrodes, in other embodiments, such as that shown, each cell 110a, 110b, 110c and 110d contains its own associated fuel electrode, oxidant electrode and charging electrode (i.e. spaced from one another). As depicted in FIG. 1, fuel electrode 112a, oxidant electrode 114a and charging electrode 116a are associated with cell 110a. Similarly, fuel electrode 112b, oxidant electrode 114b and charging electrode 116b are associated with cell 110b; fuel electrode 112c, oxidant electrode 114c and charging electrode 116c are associated with cell 110c; and fuel electrode 112d, oxidant electrode 114d and charging electrode 116d are associated with cell 110d. In some embodiments, however, a fuel electrode of one cell may be understood as participating in electrochemical reactions with oxidant reduction electrodes and/or charging electrodes associated with other cells (e.g. fuel electrode 112a associated with cell 110a may be coupled to oxidant reduction electrode 114b and/or charging electrode 116b associated with cell 110b).

Fuel electrodes 112a, 112b, 112c, and 112d of cell system 100 may be supported in the interior cell chamber 104 so as to be contacted by the ionically conductive medium. In an embodiment, a fuel electrode is a metal fuel electrode that functions as an anode when the cell system 100 operates in discharge, or electricity generating mode and functions as a cathode when the cell system 100 operates in charge, or electricity consuming mode. The fuel may be provided to the cell system 100 as particles suspended in the ionically conductive medium. The fuel electrode may be provided as a permeable electrode body (mesh, screen, etc.). A permeable electrode body may include a screen that is made of any formation that is able to capture and retain, through electrodeposition, or otherwise, particles or ions of metal fuel from the ionically conductive medium that flows through or is otherwise present within the cell chamber 104. Further details regarding permeable electrode bodies, configurations and operation thereof may be described in U.S. Pat. Nos. 8,168,337; 8,309,259; 8,659,268; and patent application Ser. Nos. 12/885,268; 13/230,549; 13/277,031; 13/299,167; previously incorporated by reference above.

The fuel used in the cell system 100 may be a metal, such as iron, zinc, aluminum, magnesium, lead, cadmium, nickel or lithium. By metal, this term is meant to encompass all elements regarded as metals on the periodic table, including but not limited to alkali metals, alkaline earth metals, lanthanides, actinides, semi-metals, "poor" metals, post-transition and transition metals, either in atomic, molecular (including metal hydrides), or alloy form when collected on the electrode body. However, the present invention is not intended to be limited to any specific fuel, and others may be used.

The illustrated embodiment of FIG. 1 depicts a single fuel electrode 112a, 112b, 112c, and 112d associated with each cell 110a, 110b, 110c, and 110d (respectively), however in some embodiments the fuel electrode may comprise a plurality of permeable electrode bodies such as described in U.S. Pat. No. 8,309,259 and U.S. application Ser. Nos. 13/299,167 and 13/230,549. The electrode bodies may have different sizes so that a stepped scaffold configuration may be used, for example as described by U.S. Pat. No. 8,659,268 and incorporated by reference above, in other embodiments the electrodes may have substantially the same size. In some embodiments, a common fuel electrode may be the fuel electrode for a plurality of adjacent cells 110a, 110b, 110c, and/or 110d. For example, in the illustrated embodiment, fuel electrode 112a and fuel electrode 112b may be replaced by a common fuel electrode shared by both cell 110a and cell 110b.

In an embodiment, the oxidant reduction electrode 114a, 114b, 114c, and 114d may be of any appropriate construction or configuration. For example, the oxidant reduction electrode 114a, 114b, 114c, and/or 114d may generally be configured to support oxygen reduction in the electrochemical cell system 100, to create a potential difference with the fuel electrode 112a, 112b, 112c, and/or 112d during discharge of the cell system 100. In an embodiment, the oxidant reduction electrode 114a, 114b, 114c, and/or 114d may contain an active layer having meshes or coatings that may be characterized as "active material(s)". The active material (s) facilitate the electrochemical reactions associated with oxygen reduction. Accordingly, in an embodiment, the oxidant reduction electrode 114a, 114b, 114c, and/or 114d is positioned in the cell chamber 104 such that the active materials contact the ionically conductive medium allowing ions to be conducted to and/or from the fuel electrode 112a, 112b, 112c, and/or 112d. In some embodiments, the active materials of the oxygen reduction electrode may be formed by a mixture of catalyst particles or materials, conductive matrix and hydrophobic materials, sintered to form a composite material or otherwise layered together. In various embodiments the active materials may be constructed of one or more metals and/or their oxides, such as but not limited to manganese, silver, nickel, platinum, lanthanum, strontium, and cobalt. For further details regarding oxidant electrodes, reference may be made to U.S. patent application Ser. Nos. 13/531,962 13/553,269; 13/668,180; and 13/668, 185 previously incorporated herein in their entirety.

In an embodiment, the oxidant reduction electrode 114a, 114b, 114c, and/or 114d may be sealed or otherwise assembled into an oxidant reduction electrode module that is immersed into the ionically conductive medium in the cell chamber 104. At least one air channel (individually air channels 118a, 118b, 118c and 118d) may extend into the oxidant reduction electrode module, so as to provide air or any other oxidant to the oxidant reduction electrode 114a, 114b, 114c, and/or 114d. Further details of such a configuration are described in U.S. patent application Ser. No. 13/531,962 previously incorporated by reference in its entirety herein.

As shown, in embodiments containing a separate charging electrode 116a, 116b, 116c, and 116d, the charging electrode 116a, 116b, 116c, and 116d may be positioned between the respective oxidant reduction electrode and the respective fuel electrode. In embodiments of the cell lacking a separate charging electrode, the oxidant reduction electrode 114a, 114b, 114c, and/or 114d may be utilized both during charging and discharging of the cell 110a, 110b, 110c, and/or 110d (i.e. as an anode during charging and as a cathode during discharging).

In the illustrated embodiment of FIG. 1, associated with each cell 110a, 110b, 110c, 110d are charging electrodes 116a, 116b, 116c, and 116d. Although in the illustrated embodiment the charging electrode 116a, 116b, 116c, and 116d is spaced from the fuel electrode 112a, 112b, 112c, and 112d, it may be appreciated that in some embodiments the charging electrode 116a, 116b, 116c, and/or 116d may comprise a portion of the fuel electrode 112a, 112b, 112c, and/or 112d, requiring a suitable electrically insulating material. As shown, the dedicated charging electrode 116a, 116b, 116c, and 116d may generally be positioned between the fuel electrode 112a, 112b, 112c, and 112d and the oxidant reduction electrode 114a, 114b, 114c, and 114d; however various other arrangements are also possible. A charging electrode 116a, 116b, 116c, and/or 116d may be spaced from the fuel electrode. In some embodiments, the charging electrode 116a, 116b, 116c, and/or 116d may be a portion of the fuel electrode 112a, 112b, 112c, and/or 112d (including, for example, being one or more of the permeable electrode bodies). As with the fuel electrode 112a, 112b, 112c, and/or 112d, the charging electrode 116a, 116b, 116c, and/or 116d may be positioned within the cell chamber 104, so as to be in contact with the ionically conductive medium. The charging electrode 116a, 116b, 116c, and/or 116d may be configured to participate in the oxidation of an oxidizable oxidant species, which is present in the liquid ionically conductive medium, so as to promote the reduction of an oxidized metal fuel species and growth of the metal fuel on the fuel electrode 112a, 112b, 112c, and/or 112d during charging of cell 110a, 110b, 110c, and/or 110d. Accordingly, in some embodiments, the charging electrode 116a, 116b, 116c, and/or 116d may be characterized as an oxygen evolving electrode, due to gaseous species formed during the reduction process at the charging electrode 116a, 116b, 116c, and/or 116d during the charging of the electrochemical cell 110a, 110b, 110c, and/or 110d.

In an embodiment, bubbles formed during charging may rise from where they are evolved on the charging electrode 116a, 116b, 116c, and/or 116d towards the liquid electrolyte level L, and develop a flow of the ionically conductive medium. It may be appreciated that the spaced arrangement of the charging electrodes 116a, 116b, 116c, and/or 116d may generally drive the bubbles, and thus the flow, away from one another, over the opposing oxidant reduction electrodes 114a, 114b, 114c, and/or 114d, a flow pattern which is generally depicted by arrows 120. Various other flow patterns of the ionically conductive medium are also possible, for example, such as those described in U.S. patent application Ser. Nos. 13/532,374 and 13/666,864 previously incorporated herein in their entirety. Furthermore, although not illustrated in FIG. 1, in some embodiments, diffusers, flow diverters or other flow modifying bodies may be implemented.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, lithium hydroxide or lithium chloride. In some embodiments, the ionically conductive medium is aqueous potassium hydroxide. In an embodiment, the ionically conductive medium may comprise an electrolyte. For example, a conventional liquid electrolyte solution may be used, or a room temperature ionic liquid may be used, as mentioned in U.S. patent application Ser. No. 12/776,962, previously incorporated by reference above. In some embodiments, additives may be added to the ionically conductive medium, including but not limited to additives that enhance the electrodeposition process of the metal fuel on fuel electrode, such as is described in U.S. patent application Ser. Nos. 13/028,496 and 13/526, 432 previously incorporated by reference above. Such additives may control dendritic growth of fuel particles, reduce the likelihood of fuel particles separating from fuel electrode 112a, 112b, 112c, and/or 112d during discharge and/or create an undesirable electrical contact between electrodes internal to the cell system 100, for example.

In various non-limiting embodiments, the fuel electrode 112a, 112b, 112c, and/or 112d, the oxidant reduction electrode 114a, 114b, 114c, and/or 114d and the separate charging electrode 116a, 116b, 116c, and/or 116d may be connected by a switching system that may be configured to connect the cell 110a, 110b, 110c, and/or 110d and cell system 100 to a power supply, a load, or other cells in series and/or parallel. During discharge, fuel electrodes 112a, 112b, 112c, and/or 112d are connected to the load, and operate as an anode so that electrons given off by the metal fuel, as the fuel is oxidized at the fuel electrode 112a, 112b, 112c, and/or 112d, flows to the external load. The oxidant reduction electrodes 114a, 114b, 114c, and/or 114d function as the cathode during discharge, and are configured to receive electrons from the external load and reduce an oxidizer that contacts oxidant reduction electrode 114a, 114b, 114c, and/or 114d, specifically oxygen in the air surrounding cell 110a, 110b, 110c, and/or 110d, oxygen being fed into cell 110a, 110b, 110c, and/or 110d, or oxygen recycled from cell 110a, 110b, 110c, and/or 110d. During charge, fuel electrode 112a, 112b, 112c, and/or 112d is connected to the power supply, and operates as a cathode so that oxidized fuel within the ionically conductive medium is reduced at fuel electrode 112a, 112b, 112c, and/or 112d. The charging electrode 116a, 116b, 116c, and/or 116d functions as the anode during charge, and oxidizes the reduced oxidant that contacts charging electrode 116a, 116b, 116c, and/or 116d, specifically evolving oxygen into the ionically conductive medium. Various switching system configurations and operations thereof are possible, for example, such as those described in U.S. Pat. No. 8,309,259 and U.S. application Ser. Nos. 12/885,268; 13/083,929; 13/299,167; 13/230,549 and 13/277,031 previously incorporated herein in their entirety.

It may be appreciated that the electrochemical reactions occurring during charging and discharging of the cell system 100 may be reduction-oxidation (redox) reactions. For example, in an embodiment where the metal fuel is zinc, the ionically conductive medium may contain reducible zinc ions that are to be plated as zinc fuel on the fuel electrode 112a, 112b, 112c, and/or 112d. In one such embodiment, the reduction reaction takes place at fuel electrode 112a, 112b, 112c, and/or 112d (the reduction site), and may conform to $Zn(OH)_4^{2-}+2e^- \rightarrow Zn+4OH^-$. The corresponding oxidation reaction occurs at charging electrode 116a, 116b, 116c, and/or 116d, and may conform to $2OH^- \rightarrow H_2O + \frac{1}{2} O_2 + 2e^-$. The charging electrode 116a, 116b, 116c, and/or 116d is therefore understood to be producing oxygen gas within the cell system 100, and thus may be characterized as an oxygen evolving electrode. It may be appreciated that in some embodiments different metal fuels are utilized, and thus other reactions may occur, which may also evolve oxygen or other gases in cell system 100.

In an embodiment where the metal fuel is zinc, the oxidation reaction may correspond to the equation $Zn \rightarrow Zn^{2+} + 2e^-$. The zinc ions may bond with hydroxide ions in the ionically conductive medium, in a manner that corresponds to $Zn^{2+} + 4OH^- \rightarrow Zn(OH)_4^{2-}$. The zincate ($Zn(OH)_4^{2-}$) could then flow in the ionically conductive medium, and be available for reduction to zinc fuel at fuel electrode 112a, 112b, 112c, and/or 112d during a future charging of cell system 100.

During a discharge process, the concentration of the reducible metal species (e.g. $Zn(OH)_4^{2-}$) in the electrolyte increases towards a saturation point. Not to be bound by any particular theory, but as the concentration of reducible metal species in solution increases, the electrolytic resistance (e.g., internal cell resistance) may increase. On discharge, a lower concentration of reducible metal fuel ions in solution may be desirable, thereby increasing electrolyte conductivity and power density of the cell system 100. Additionally, a deep discharge process to remove accumulated metal fuel buildup (e.g. during a fuel electrode reset) may be effectively prevented due to a high electrolyte resistance, particularly towards end of the deep discharge when the metal fuel species is at the highest concentration.

Additionally, high concentration of metal fuel ions in the solution surrounding discharging fuel electrode, usually well above the saturation level at given temperature, may cause formation of inter-electrode shorts. Not to be bound by any particular theory, one possible mechanism of the shorts formation can be described as follows. Metal fuel oxide (e.g. ZnO) formations may develop on the surface of discharging fuel electrode when concentration of the metal fuel ions in the surrounding solution increases above saturation level. During a subsequent charge process, the metal fuel may plate over these oxide formations. Towards the end of the charge process as the metal fuel ions concentration in the electrolyte drops below saturation, the metal oxide formation (e.g. ZnO) may dissolve. Subsequently on a deeper discharge, a portion of Zn metal located in generally more interior layer of the deposit may dissolve electrochemically and a conductive flake-like formation may develop. These relatively large flakes may then undesirably lodge or embed around the electrodes, possibly forming a short between electrodes effectively hindering operation of cell system 100.

It may be appreciated that multiple electrodes of cells 110a, 110b, 110c, and/or 110d within the same ionically conductive medium of electrochemical cell system 100 facilitates the regulation of metal ion concentration in solution. This idea of maintaining multiple cells 110a, 110b, 110c, and/or 110d in a single electrolyte volume of cell system 100 provides a unique opportunity to regulate metal fuel ions concentration in the electrolyte during both a normal operation mode and a conditioning mode or process (e.g. to remove accumulated metal fuel buildup or dendritic formations). The advantages of this configuration will be described in the following paragraphs.

It may be appreciated that in an embodiment a fixed quantity of fuel and metal fuel ions may be distributed between the metal fuel on the fuel electrodes 112a, 112b, 112c, and 112d of each of the cells 110a, 110b, 110c, and 110d, dislodged metal fuel (e.g., loose dendrites) in the ionically conductive liquid, and metal fuel ions in solution with the ionically conductive liquid. Accordingly, selective charging of the cells 110a, 110b, 110c, and/or 110d may reduce the concentration of metal fuel ions in the ionically conductive liquid in a controlled manner. It may be appreciated that charging of certain cells 110a, 110b, 110c, and/or 110d over other cells may similarly be used to control the concentration of metal fuel ions in the ionically conductive liquid, as well as controlling the metal fuel in each cell 110a, 110b, 110c, and/or 110d. In a normal operating mode of an embodiment of cell system 100, all cells 110a, 110b, 110c, and/or 110d may be active (e.g., not held at a predetermined state of charge (SOC)); in this situation, the energy density, or charge capacity, of cell system 100 are maximized. Alternatively, a predetermined fraction of cells 110a, 110b, 110c, and/or 110d may be in an active state while the remaining fraction of cells are in an inactive state (e.g., held in a charged state at a predetermined SOC to set the metal fuel concentration in the electrolyte). In this situation, the electrolyte conductivity and/or power density of cell system 100 may be increased as a result of a lower concentration of metal fuel ions.

In addition to the advantages provided by the invention in a normal operating mode, cell system 100 conditioning processes are also facilitated. For example, during a conditioning mode, a predetermined fraction of cells 110a, 110b, 110c, and/or 110d are held in an inactive, or charged state (i.e. high SOC), which lowers the concentration of metal ions in solution. The remaining fraction of cells 110a, 110b, 110c, and/or 110d may then be reset, for example, to remove metal fuel build-up and/or dendritic formations associated with fuel electrodes 112a, 112b, 112c, and/or 112d. Embodiments of such conditioning processes will be described in the following paragraphs. The former may be referred to as a charged group and the latter as a reset group. As noted below, resetting of the cells 110a, 110b, 110c, and/or 110d, however, may be accomplished by any appropriate process. For example, embodiments of such resetting processes may include charge-discharge pulsing, or resetting processes such as those disclosed in U.S. patent application Ser. No. 13/277,031, incorporated by reference above.

Figure 2:
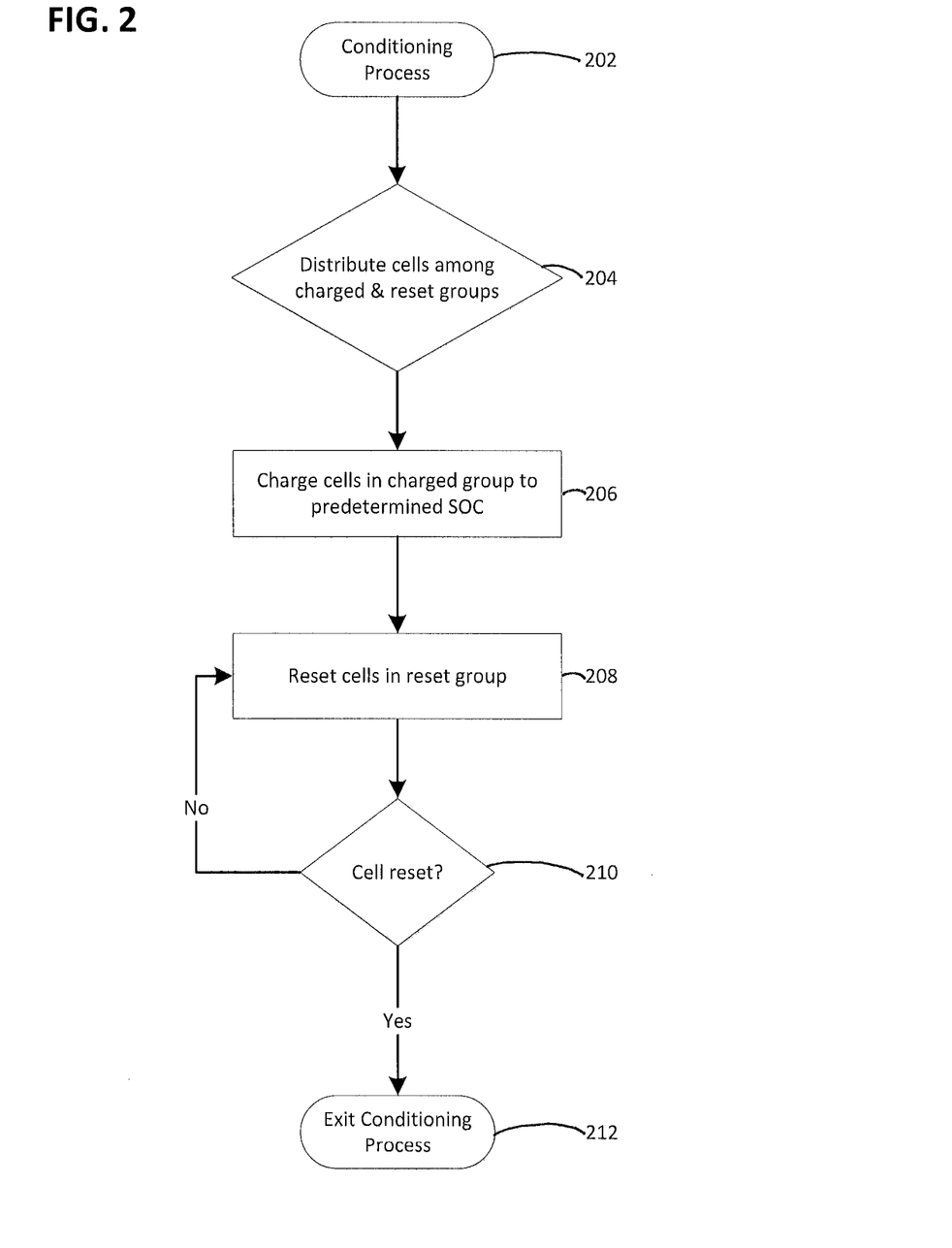
FIG. 2 depicts a flow diagram of a conditioning process.

In an embodiment depicted in FIG. 2, a process 202 for conditioning electrochemical cell system 100 may comprise a first step 204 of distributing the fuel electrodes 112a, 112b, 112c, and/or 112d into groups, the groups comprising a charged group and a reset group. The fuel electrode(s) 112a, 112b, 112c, and/or 112d assigned to the charged group may be charged to a predetermined SOC at step 206. This will have the effect of setting the concentration of metal fuel ions in the ionically conductive medium of cell system 100. The fuel electrode(s) 112a, 112b, 112c, and/or 112d assigned to the reset group may then be reset according to a suitable resetting process at step 208.

In an embodiment, the conditioning process 202 may be initiated as a result of a voltage measurement, a current measurement, an impedance measurement, a cumulative SOC (Ah), a temperature measurement, a charge capacity measurement, a cycle number, an elapsed time, a predetermined schedule, a manual user command or a combination thereof. For example, one or more sensing devices associated with the cell system 100 (e.g., associated with each cell 110a, 110b, 110c, and/or 110d) may be configured to measure these measurements, and/or may derive these measurements from these or other measurements. In an embodiment, the measurements may be for one or more cells 110a, 110b, 110c, and/or 110d in the cell system 100, or may be for the cell system 100 as a whole. In an embodiment, the one or more sensing devices may be coupled to a controller (e.g., electronics, circuitry, and/one or more processors) configured to receive sensed data from the one or more sensor devices. In an embodiment, the controller may be configured to cause the selective charging or discharging of the cells 110a, 110b, 110c, and/or 110d, as described herein. In an embodiment, the controller may be configured to continue measuring, computing, or estimating the measurements of one or more of the fuel electrodes 112a, 112b, 112c, and/or 112b or elsewhere in the cell system 100, and may selectively control the charging and/or discharging of cells 110a, 110b, 110c, and/or 110d according to the measurements. In some embodiments, the conditioning process is initiated when power from an external power source is available. The cell system 100 may exit the conditioning process 212 by determining if a fuel electrode 112a, 112b, 112c, and/or 112d and/or cell 110a, 110b, 110c, and/or 110d has been satisfactorily reset at step 210 based on a voltage measurement, a current measurement, an impedance measurement, a cumulative SOC (Ah), a charge capacity or a combination thereof. In some embodiments, the cell system 100 may exit the conditioning process 212 based on a predetermined schedule, elapsed time, a manual user command, when an external power source becomes unavailable or a combination thereof.

In an embodiment, the fuel electrodes 112a, 112b, 112c, and/or 112d are distributed into groups, the groups comprising a charged group and a reset group according to a predetermined schedule. In other embodiments, the charge capacity of a fuel electrode 112a, 112b, 112c, and/or 112d may be sensed by any appropriate means, or calculated based on measured data. In an embodiment, if the charge capacity is less than a predetermined charge capacity by a greater than a threshold amount, the fuel electrode may be assigned to the reset group.

In an embodiment, cycle number may be used to determine a pre-scheduled order in a conditioning process of system 100. For example, in system 100 comprising four cells 110a-d, after a first predetermined number of charge-discharge cycles, all "odd" cells (i.e. cell 110a and 110c in the illustrated embodiment) enter a reset process while "even" cells (i.e. cells 110b and 110d in the illustrated embodiment) remain charged, thereby setting the concentration of reducible metal fuel ions in the electrolyte. Once cells 110a and 110c are reset, system 100 may then enter a normal charge/discharge mode. After a second predetermined number of charge-discharge cycles, all "even" cells (i.e. cell 110b and 110d herein) may then start resetting with all "odd" cells (i.e. 110a and 110c herein) being held in charged condition. Such a schedule may be repeated infinite number of times and in any suitable alternating pattern. Alternatively, cells 110a, 110b, 110c, and/or 110d can be reset in a sequential pattern. For example, after a first predetermined number of charge-discharge cycles, cell 110a starts resetting while all other cells 110b-d of system 100 remain charged. After a second predetermined number of charge-discharge cycles, cell 110b starts re-setting while all other cells 110a,c,d of cell system 100 remain charged. This conditioning pattern may proceed across any suitable number of cells 110a, 110b, 110c, and/or 110d in system 100.

In some embodiments, a voltage measurement may be determined between fuel electrode 112a, 112b, 112c, and/or 112d and an associated oxidant electrode 114a, 114b, 114c, and/or 114d during a discharge process, or between a fuel electrode 112a, 112b, 112c, and/or 112d and an associated charging electrode 116a, 116b, 116c, and/or 116d during a charge process. By comparing this voltage measurement to a predetermined voltage associated with fuel electrode 112a, 112b, 112c, and/or 112d, the cell 110a, 110b, 110c, and/or 110d and/or fuel electrode 112a, 112b, 112c, and/or 112d may be assigned to the reset group. For example, if the measured discharge voltage between fuel electrode 112a and oxidant electrode 114a is less than the predetermined discharge voltage by greater than a threshold amount, fuel electrode 112a may be assigned to the reset group based on this comparison. Alternatively, if the measured charge voltage between fuel electrode 112a and charging electrode 116a is greater than the predetermined charge voltage by greater than a threshold amount, fuel electrode 112a may be assigned to the reset group.

In some embodiments, the ohmic resistance of fuel electrode 112a, 112b, 112c, and/or 112d may be determined via a voltage or current measurement between fuel electrode 112a, 112b, 112c, and/or 112d and any other suitable electrode associated with cell system 100. The determined resistance may be compared to a predetermined resistance or predetermined resistance value; and cell 110a, 110b, 110c, and/or 110d and/or fuel electrode 112a, 112b, 112c, and/or 112d may be assigned to the reset group based on this comparison. For example, if the ohmic resistance between fuel electrode 112a and charging electrode 116a is greater than a predetermined resistance measured between the same two electrodes by greater than a threshold amount, cell 110a may be assigned to the reset group.

In an embodiment, the resetting process (which may be a sub-process of the cell system 100 conditioning process, as described herein) may comprise discharging the cells 110a, 110b, 110c, and/or 110d at a sufficiently slow rate to electrochemically remove all fuel metal formations, thereby mediating metal dendrite build-up on fuel electrodes. For example, discharge may proceed at a constant voltage followed by a discharge at a constant current. The constant voltage discharge may be a voltage-limited discharge wherein discharge proceeds until the discharge current drops below a pre-determined current limit. The constant current discharge may be a current-limited discharge wherein discharge proceeds until the discharge voltage drops below a pre-determined voltage limit. The limits in the reset process may be defined based on an optimal balance between 1) sufficient removal of undesirable metal fuel formations at the fuel electrode 112a, 112b, 112c, and/or 112d and 2) operational practicality (e.g., completion of the reset procedure in appropriately short time to support operational demand). In some embodiments, the predetermined voltage limit of the constant current discharge may be equal to the cut-off limit of the previous constant voltage discharge step or any other suitable predetermined or measured value.

In an embodiment, the discharging of the fuel electrodes within the reset group may comprise discharging the fuel electrodes at a generally constant voltage down to a discharge current density below approximately 100 $\mu A/cm^2$, and discharging the fuel electrodes at a generally constant current down to a cell voltage below approximately 1V. In an embodiment, the current discharge current density may be below approximately 50 $\mu A/cm^2$. In an embodiment, the constant current may be below approximately 500 $\mu A/cm^2$. In an embodiment, the constant current may be below approximately 50 $\mu A/cm^2$. In an embodiment, the discharge at the generally constant current may be down to a cell voltage of approximately 0.5V. In some embodiments the discharging of the fuel electrodes within a reset group may be at a generally constant voltage down to a discharge current density below approximately 10 $mA/cm^2$. In an embodiment the discharging of the fuel electrodes within a reset group may be at a generally constant voltage down to a discharge current density below approximately 1 $mA/cm^2$.

In some embodiments, the reset procedure may comprise charge-discharge pulsing, which may make re-activate some passivated fuel metal films and/or particles, thereby increasing the effectiveness of the procedure. As a non-limiting example of a charge-discharge pulsing resetting method, a fuel electrode 112a, 112b, 112c, and/or 112d may initially be discharged in steps by decrementing the discharge current or voltage by a predetermined step value, such that the metal fuel is oxidized on the fuel electrode 112a, 112b, 112c, and/or 112d without entering the passivation regime, and an oxidant is reduced at the oxidant electrode 114a, 114b, 114c, and/or 114d. The discharging may then be discontinued as a result of a suitable voltage measurement, current measurement, a cumulative SOC (Ah), impedance measurement, temperature measurement, charge capacity, elapsed time, predetermined schedule, manual user command or a combination thereof. This may be immediately followed by a charging step wherein an electrical current between the fuel electrode 112a, 112b, 112c, and/or 112d and the charging electrode 116a, 116b, 116c, and/or 116d is applied, such that the metal fuel is reduced at the fuel electrode 112a, 112b, 112c, and/or 112d and an oxidizable species of the oxidant is oxidized at the charging electrode 116a, 116b, 116c, and/or 116d. The charging step may then be discontinued as a result of a voltage measurement, current measurement, a cumulative SOC (Ah), impedance measurement, temperature measurement, charge capacity, elapsed time, predetermined schedule, manual user command or a combination thereof. These charge/discharge steps of the reset pulsing method may be repeated any suitable number of times to effectively mediate build-up of metal fuel formations at the fuel electrode 112a, 112b, 112c, and/or 112d, thereby resetting the fuel electrode 112a, 112b, 112c, and/or 112d to provide greater charge capacity and cycling capability in normal operational modes of the cell system 100.

Once the metal ion concentration in the electrolyte is regulated by the SOC of fuel electrode(s) 112a, 112b, 112c, and/or 112d assigned to the charged group, any appropriate resetting process may be employed comprising any suitable number or type of steps. For example, a resetting process such as that described in the U.S. patent application Ser. No. 13/277,031 may additionally or alternatively be employed.

Depending on the desired application in terms of its power or energy density demand, cell system 100 may be operated in a high power or high energy density modes. It may thus be appreciated that the invention described herein essentially decouples power and energy density of cell system 100, delivering a high degree of flexibility.

EXAMPLES

In an exemplary embodiment, a Zn-air electrochemical cell system is provided as a quad-cell comprising four cells. The ionically conductive medium is an electrolyte comprising 1.4M Zn in 8M KOH. Reducible zinc ions are plated as zinc fuel on the fuel electrodes of the cell system. The full charge capacity of the cell system is ca. 700 Ah (175 Ah per cell). Table 1 shows the regulated Zn ion concentration in the electrolyte as a function of the number of cells in a charged state (i.e. remain inactive to set Zn ion concentration in the electrolyte).

TABLE 1

Zn molarity as function of number of cells held at charged state with initial electrolyte concentration of 1.4M Zn.

| # cells in charged state | Cell system SOC (Ah) | Zn molarity in electrolyte | Saturation % |
| --- | --- | --- | --- |
| 0 | 0 | 1.4 | 1.82 |
| 1 | 175 | 1.09 | 1.41 |
| 2 | 350 | 0.77 | 1 |
| 3 | 525 | 0.456 | 0.59 |

When all cells are in an active state (i.e. cell system SOC=0 Ah), the charge capacity of the cell system is at its maximum value of 700 Ah and the initial metal ion concentration in electrolyte solution is 1.4M Zn. The degree of Zn saturation is at its highest value of 1.82 (calculated from Zn molarity divided by 0.77M, which is the saturation concentration at room temperature). If one cell is assigned to a charged state (i.e. cell system SOC=175 Ah), the charge capacity of the cell system drops to 525 Ah, the initial metal ion concentration in electrolyte solution drops to 1.09M Zn, and the degree of Zn saturation drops to 1.41. In this situation, system power density increases and the likelihood of Zn electrode passivation decreases as a result of a lower concentration of metal fuel ions in the electrolyte. The power density is maximized and the likelihood of Zn electrode passivation is minimized as the charge/discharge processes proceed unimpeded by high Zn concentrations in solution if three cells are held in a charged state (i.e. cell system SOC=525 Ah).

The foregoing illustrated embodiments have been provided solely for illustrating the structural and functional principles of the present invention and are not intended to be limiting. For example, the present invention may be practiced using a variety of fuels, oxidizers, electrolytes, and/or overall structural configurations or materials. Thus, the present invention is intended to encompass all modifications, substitutions, alterations, and equivalents within the spirit and scope of the following appended claims.

What is claimed is:

1. A process for conditioning an electrochemical cell system comprising at least two electrochemical cells, wherein each cell comprises:
    (i) a fuel electrode for receiving electrodeposited metal fuel;
    (ii) an oxidant electrode spaced apart from the fuel electrode; and
    (iii) a charging electrode spaced apart from the fuel electrode;
    the cell system comprising a housing defining an interior chamber for containing the at least two electrochemical cells and an ionically conductive medium common to the cells of the electrochemical cell system therein, the ionically conductive medium communicating with the fuel, oxidant, and charging electrodes for conducting ions to support electrochemical reactions at the fuel, oxidant, and charging electrodes, and the ionically conductive medium comprising reducible metal fuel ions;
    the fuel electrode and the oxidant electrode of each cell being configured to, during a discharge mode, oxidize the metal fuel at the fuel electrode and reduce an oxidant at the oxidant electrode to generate an electrical discharge current therebetween for application to a load; and,
    the fuel electrode and the charging electrode of each cell being configured to, during a charge mode, reduce a reducible species of the metal fuel to electrodeposit the metal fuel on the fuel electrode and oxidize an oxidizable species of the oxidant by application of an electrical charge current therebetween from a power source;
    wherein the conditioning process comprises:
        (i) selecting from the fuel electrodes of the at least two electrochemical cells: a charged fraction of fuel electrode(s) and a reset fraction of fuel electrode(s), wherein the charged fraction of fuel electrode(s) are charged to a predetermined state of charge to reduce a concentration of the reducible metal fuel ions in solution in the ionically conductive medium;
        (ii) maintaining the fuel electrode(s) within the charged fraction at or above the predetermined state of charge; and
        (iii) resetting the fuel electrode(s) within the reset fraction while the fuel electrode(s) within the charged fraction are maintained at or above the predetermined state of charge.

2. The process according to claim 1, wherein the charging electrode of each cell is selected from the group consisting of: (a) the oxidant electrode and (b) a third electrode.

3. The process according to claim 1, wherein said resetting comprises removing dendritic fuel formations at the fuel electrode(s).

4. The process according to claim 1, wherein said resetting comprises pulsing charging and discharging to remove dendritic formations at the fuel electrode(s) within the reset fraction.

5. The process according to claim 1, further comprising using, to initiate the conditioning process, one or more of a voltage measurement, a current measurement, an impedance measurement, a temperature measurement, a charge capacity, an elapsed time, a schedule, and a manual user command, and initiating said conditioning process based on a result of said measuring.

6. The process according to claim 1, further comprising detecting availability of power from the power source, and initiating the conditioning process when the power from the power source is available.

7. The process according to claim 1, wherein the selecting of the fuel electrodes into the fractions is performed periodically according to a schedule.

8. The process according to claim 1, wherein the selecting of the fuel electrodes into the fractions comprises:
    sensing a present charge capacity for a first fuel electrode selected from one of the at least two electrochemical cells;
    comparing the present charge capacity to a predetermined charge capacity; and
    if the present charge capacity is less than the predetermined charge capacity by a greater than a threshold amount, assigning the first fuel electrode to the reset fraction.

9. The process according to claim 1, wherein the selecting of the fuel electrodes into the fractions comprises:
    sensing a present voltage between the fuel electrode of a first electrochemical cell selected from one of the at least two electrochemical cells and a second electrode of the first electrochemical cell, the second electrode being selected from the group consisting of: (a) the oxidant electrode of the first electrochemical cell, and (b) the charging electrode of the first electrochemical cell;
    comparing the present voltage to a predetermined voltage; and,
    if the present voltage differs from the predetermined voltage by greater than a threshold amount, assigning the fuel electrode of the first electrochemical cell to the reset fraction.

10. The process according to claim 1, wherein the selecting of the fuel electrodes into the fractions comprises:
    sensing a present resistance of the fuel electrode of a first electrochemical cell selected from one of the at least two electrochemical cells;
    comparing the present resistance to a predetermined resistance; and,
    if the present resistance is greater than the predetermined resistance by greater than a threshold amount, assigning the fuel electrode of the first electrochemical cell to the reset fraction.

11. The process according to claim 1, wherein said resetting comprises discharging the fuel electrode(s) within the reset fraction at a set rate to remove metal fuel formations at the fuel electrode.

12. The process according to claim 11, wherein the discharging of the fuel electrode(s) within the reset fraction comprises discharging the fuel electrode(s) at a generally constant voltage down to a discharge current density below approximately 10 mA/cm$^2$.

13. The process according to claim 11, wherein the discharging of the fuel electrode(s) within the reset fraction comprises discharging the fuel electrode(s) at a generally constant voltage down to a discharge current density below approximately 100 μA/cm$^2$, and discharging the fuel electrode(s) at a generally constant current down to a cell voltage below approximately 1V.

14. The process according to claim 13, wherein the constant current is below approximately 500 µA/cm$^2$.

15. The process according to claim 13, wherein the discharging at the generally constant current is down to approximately 0.5V.

16. An electrochemical cell system comprising at least a first electrochemical cell and a second electrochemical cell within a common ionically conductive medium, wherein each of the first and second electrochemical cells comprises:
(i) a fuel electrode for receiving electrodeposited metal fuel;
(ii) an oxidant electrode spaced apart from the fuel electrode;
(iii) a charging electrode spaced apart from the fuel electrode;
a housing defining an interior chamber for containing the at least first and second electrochemical cells and the ionically conductive medium therein;
the ionically conductive medium communicating with the fuel, oxidant, and charging electrodes for conducting ions to support electrochemical reactions at the fuel, oxidant, and charging electrodes, and comprising reducible metal fuel ions;
the fuel electrode and the oxidant electrode being configured to, during a discharge mode, oxidize the metal fuel at the fuel electrode and reduce an oxidant at the oxidant electrode to generate an electrical discharge current therebetween for application to a load; and,
the fuel electrode and the charging electrode being configured to, during a charge mode, reduce a reducible species of the metal fuel to electrodeposit the metal fuel on the fuel electrode and oxidize an oxidizable species of the oxidant by application of an electrical charge current therebetween from a power source; and
one or more controllers configured to:
charge at least one of the fuel electrodes to a predetermined state of charge to reduce a concentration of the reducible metal fuel ions in solution in the ionically conductive medium;
maintain the predetermined state of charge of the at least one of the fuel electrodes from the at least first electrochemical cell and the second electrochemical cell; and,
initiate a charging, discharging, or resetting process on at least one other fuel electrode from the at least first electrochemical cell and/or the second electrochemical cell while maintaining the predetermined state of charge of the at least one the fuel electrodes.

17. The electrochemical cell system according to claim 16, the charging electrode being selected from the group consisting of: (a) the oxidant electrode and (b) a third electrode.

18. The electrochemical cell system according to claim 16, wherein the resetting process is configured to remove dendritic fuel formations present at the fuel electrode.

19. The electrochemical cell system according to claim 16, wherein the resetting process comprises the controller being configured to implement charge-discharge pulsing to remove dendritic formations at the fuel electrode.

20. The electrochemical cell system according to claim 16, wherein the fuel electrode of the first electrochemical cell comprises a series of permeable electrode bodies arranged in spaced apart relation.

21. The electrochemical cell system according to claim 20, wherein the reduced concentration of the reducible metal fuel ions in solution with the ionically conductive medium is regulated by the one or more controllers charging or discharging while the first electrochemical cell is maintained at or above the predetermined state of charge; and,
wherein the one or more controllers are configured to initiate the charging, discharging, or resetting process on at least one other permeable electrode body of the first electrochemical cell.

22. A process to remove dendritic formations in an electrochemical cell system comprising a plurality of cells, each cell comprising:
(i) a fuel electrode configured to receive electrodeposited metal fuel thereon;
(ii) an oxidant electrode spaced apart from the fuel electrode;
(iii) a charging electrode spaced apart from the fuel electrode;
the plurality of cells being contained in a housing defining an interior chamber containing a volume of ionically conductive medium therein;
the ionically conductive medium being common to the plurality of cells, the ionically conductive medium comprising a concentration of reducible metal fuel ions therein, and communicating the fuel, oxidant, and charging electrodes to support electrochemical reactions at the fuel, oxidant, and charging electrodes;
the fuel electrode and the oxidant electrode being configured to, during a discharge mode, oxidize the metal fuel at the fuel electrode and reduce an oxidant at the oxidant electrode to generate an electrical discharge current therebetween for application to a load; and,
the fuel electrode and the charging electrode being configured to, during a charge mode, reduce the reducible metal fuel ions as the electrodeposited metal fuel on the fuel electrode and oxidize an oxidizable species of the oxidant by application of an electrical charge current therebetween from a power source;
the process comprising:
(i) charging at least one of the plurality of cells to a predetermined state of charge to reduce the concentration of the reducible metal fuel ions within the ionically conductive medium; and
(ii) when the reduced concentration of the reducible metal fuel ions is below a threshold amount, discharging or resetting at least one other cell of the plurality of cells while the at least one of the plurality of cells is maintained in a charged state.

23. The process of claim 22, further comprising measuring one or more of a voltage measurement, a current measurement, an impedance measurement, a temperature measurement, and a charge capacity associated with one or more of the plurality of cells, and computing the reduced concentration of the reducible metal fuel ions in the ionically conductive medium based on said measuring.

24. The process of claim 22, wherein the charging electrode is selected from the group consisting of: (a) the oxidant electrode and (b) a third electrode.

25. The process of claim 22, further comprising sensing or computing the reduced concentration of the reducible metal fuel ions in the ionically conductive medium by one or more controllers configured to initiate charging, discharging or resetting of the plurality of cells.

* * * * *